(12) United States Patent
S et al.

(10) Patent No.: US 9,239,636 B1
(45) Date of Patent: Jan. 19, 2016

(54) SYSTEM AND METHOD FOR ADJUSTING A FIELD OF VIEW IN A CAMERA OF AN ELECTRONIC DEVICE

(71) Applicant: Intel Corporation, Santa Clara, CA (US)

(72) Inventors: Arvind S, Bangalore (IN); Gangatharan Jothiswaran, Bangalore (IN); Prasanna Krishnaswamy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/496,169

(22) Filed: Sep. 25, 2014

(51) Int. Cl.
| | |
|---|---|
| *G06K 7/10* | (2006.01) |
| *G06F 3/0346* | (2013.01) |
| *G03B 13/36* | (2006.01) |
| *G06K 9/32* | (2006.01) |
| *H04N 5/232* | (2006.01) |

(52) U.S. Cl.
CPC .............. *G06F 3/0346* (2013.01); *G03B 13/36* (2013.01); *G06K 9/3208* (2013.01); *H04N 5/23293* (2013.01); *G06F 2200/1614* (2013.01); *G06F 2200/1637* (2013.01)

(58) Field of Classification Search
USPC ................. 235/462.1, 375, 462.24, 462.42, 235/462.32, 462.22
See application file for complete search history.

(56) References Cited

U.S. PATENT DOCUMENTS

| | | | | |
|---|---|---|---|---|
| 7,832,643 | B2 * | 11/2010 | Tsikos et al. .............. | 235/462.25 |
| 2004/0041108 | A1 * | 3/2004 | Shaffer et al. .............. | 250/559.3 |
| 2008/0159653 | A1 * | 7/2008 | Dunki-Jacobs et al. ...... | 382/293 |
| 2013/0201289 | A1 * | 8/2013 | Billerbeck ............ | G01S 7/4814 348/46 |
| 2014/0002673 | A1 * | 1/2014 | Wu ...................... | H04N 17/002 348/187 |

* cited by examiner

*Primary Examiner* — Edwyn Labaze
(74) *Attorney, Agent, or Firm* — Inventive Patent Law, P.C.; Jim H. Salter

(57) ABSTRACT

A system and method for adjusting a field of view in a camera of an electronic device are disclosed. A particular embodiment includes an image capturing device; a sensor data interface to receive sensor data from at least one orientation-determining device; and an adaptable field of view (FOV) subsystem in data communication with the sensor data interface, the adaptable FOV subsystem being configured to modify the field of view of the image capturing device based on an orientation or operational mode of an electronic device associated with the sensor data.

20 Claims, 10 Drawing Sheets

VERTICAL MODE

LAY FLAT MODE

SYSTEM AND METHOD FOR ADJUSTING A FIELD OF VIEW IN A CAMERA OF AN ELECTRONIC DEVICE

TECHNICAL FIELD

This patent application relates to electronic systems, mobile devices, and computer-implemented software, according to various example embodiments, and more specifically to a system and method for adjusting a field of view in a camera of an electronic device.

BACKGROUND

Electronic devices, such as mobile computing platforms, portable devices, all-in-one desktop devices, portable-all-in-one devices (pAIO), laptop computers, handheld computers, touch screen systems, and other electronic devices typically include a variety of input subsystems and multimedia components. These devices are often designed for portability and convenience. The electronic devices often include a liquid crystal display (LCD) or plasma display, which is functionally connected to the electronic device's data processor and memory to process and display information or content. The electronic devices are also often fitted with integrated front-facing or world-facing cameras to address the needs of video or image capture, video conferencing, gaming, etc. Many of these electronic devices can be used in different modes of operation—e.g., vertical, angular, and lay flat modes to name a few. However, the field of view (FOV) requirements for the camera in these different modes of operation can be substantially different. For example, in a vertical mode, the FOV will target the users in front of the display of the electronic device, which may require a narrow FOV. In a lay flat mode, the FOV targets the users positioned around the display, which may require a wide FOV. As a result, conventional electronic devices are unable to adapt to the FOV requirements for various modes of operation in which the camera of an electronic device is used in various angular positions.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for adjusting a field of view in a camera of an electronic device are disclosed. The disclosed embodiments can be used with a wide variety of electronic devices, such as mobile computing platforms, portable devices, all-in-one desktop devices, portable-all-in-one devices (pAIO), laptop computers, handheld computers, touch screen systems, and other electronic devices typically including a camera or other image/video capturing device. Many of these electronic devices can be used in different modes of operation—e.g., vertical, angular, and lay flat modes. However, the field of view (FOV) requirements for the camera in these different modes of operation can be substantially different. For example, portable-all-in-one devices (pAIOs) are traditionally used in at least three different modes of operation—vertical, angular, and lay flat modes. PAIO devices are often fitted with integrated front-facing cameras to address the needs of image/video capture, video conferencing, gaming, etc. However, the FOV requirements in a vertical operational mode and a lay flat operational mode are different. In a vertical mode, the FOV will target the users in front of the display, which may require a narrow FOV. In a lay flat mode, the FOV targets the users positioned around the display, which may require a wide FOV. In other electronic devices, other modes of operation may be supported by the electronic device that create different angular positions of the camera and the scene being viewed and captured by the camera. The various embodiments described herein solve the issue of adapting the FOV of the camera based on the angular position of the electronic device and enable new usages with this capability. The various embodiments described herein are useful for any types of electronic devices or systems that use cameras for image/video capture applications. The details of various example embodiments are provided below.

Figure 1:
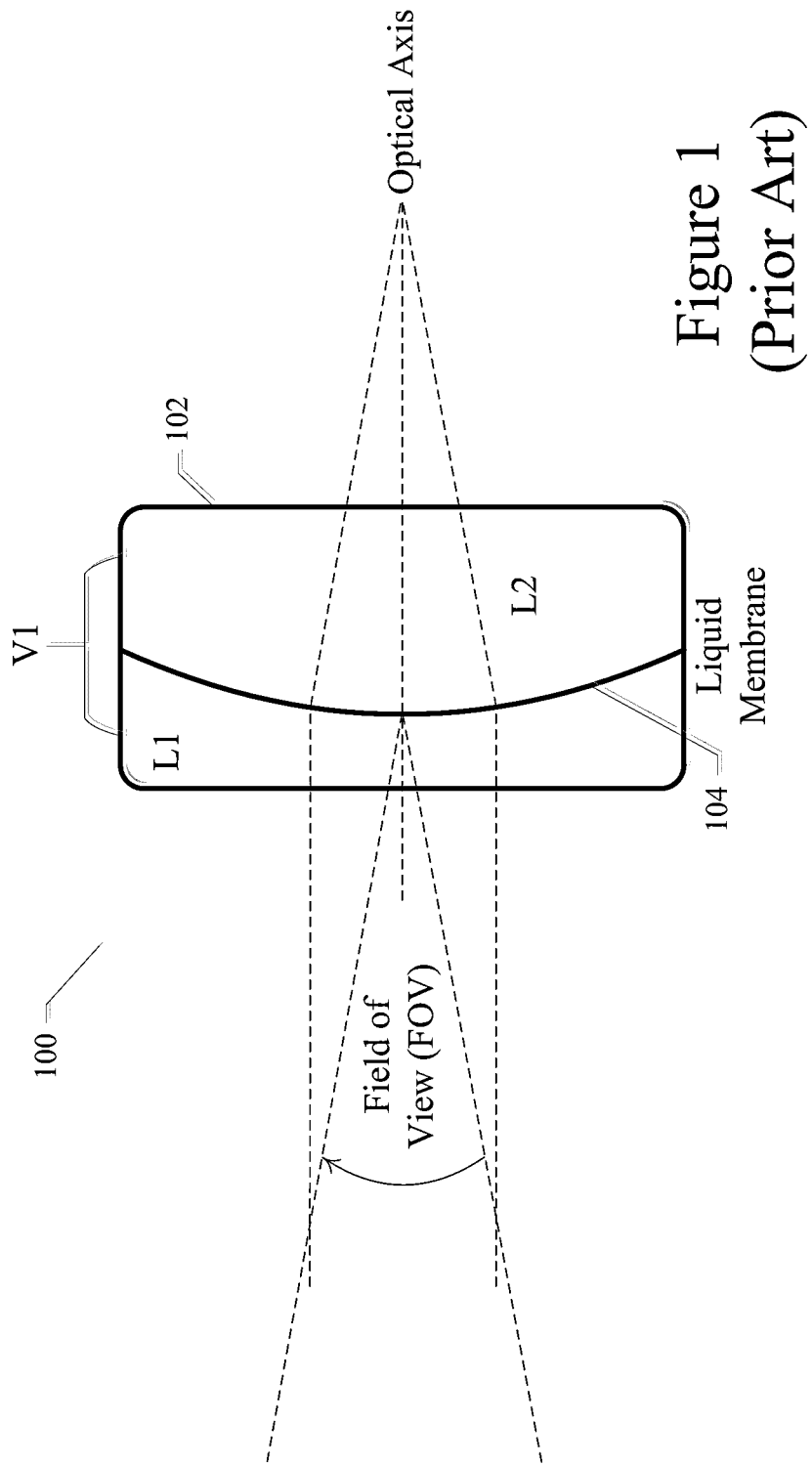
FIGS. 1 through 3 illustrate a first example embodiment in which the adaptable field of view (FOV) subsystem is implemented by providing a lens system with a camera lens having a dynamically adjustable curvature.
Figure 2:
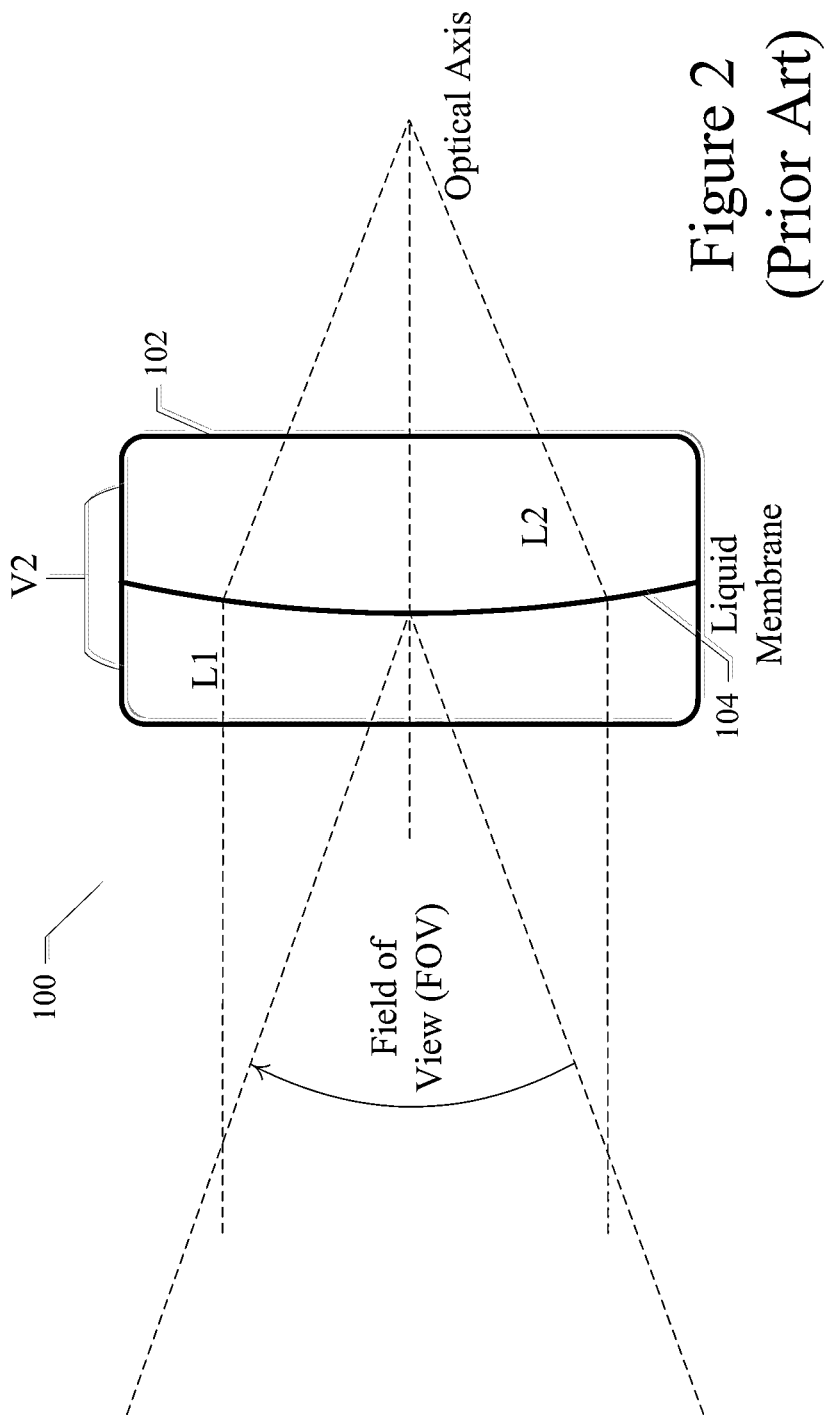
Figure 3:
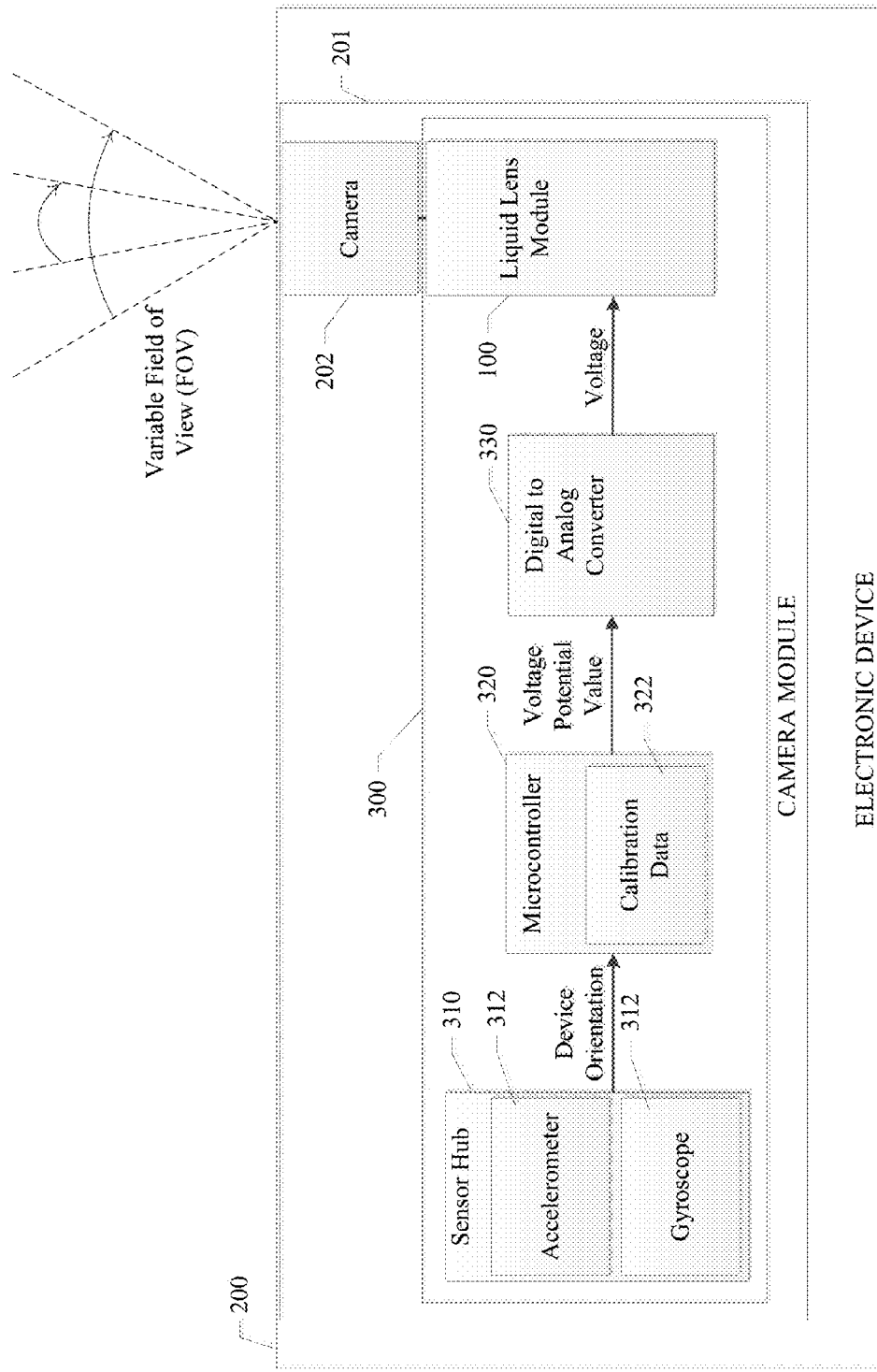
Figure 4:
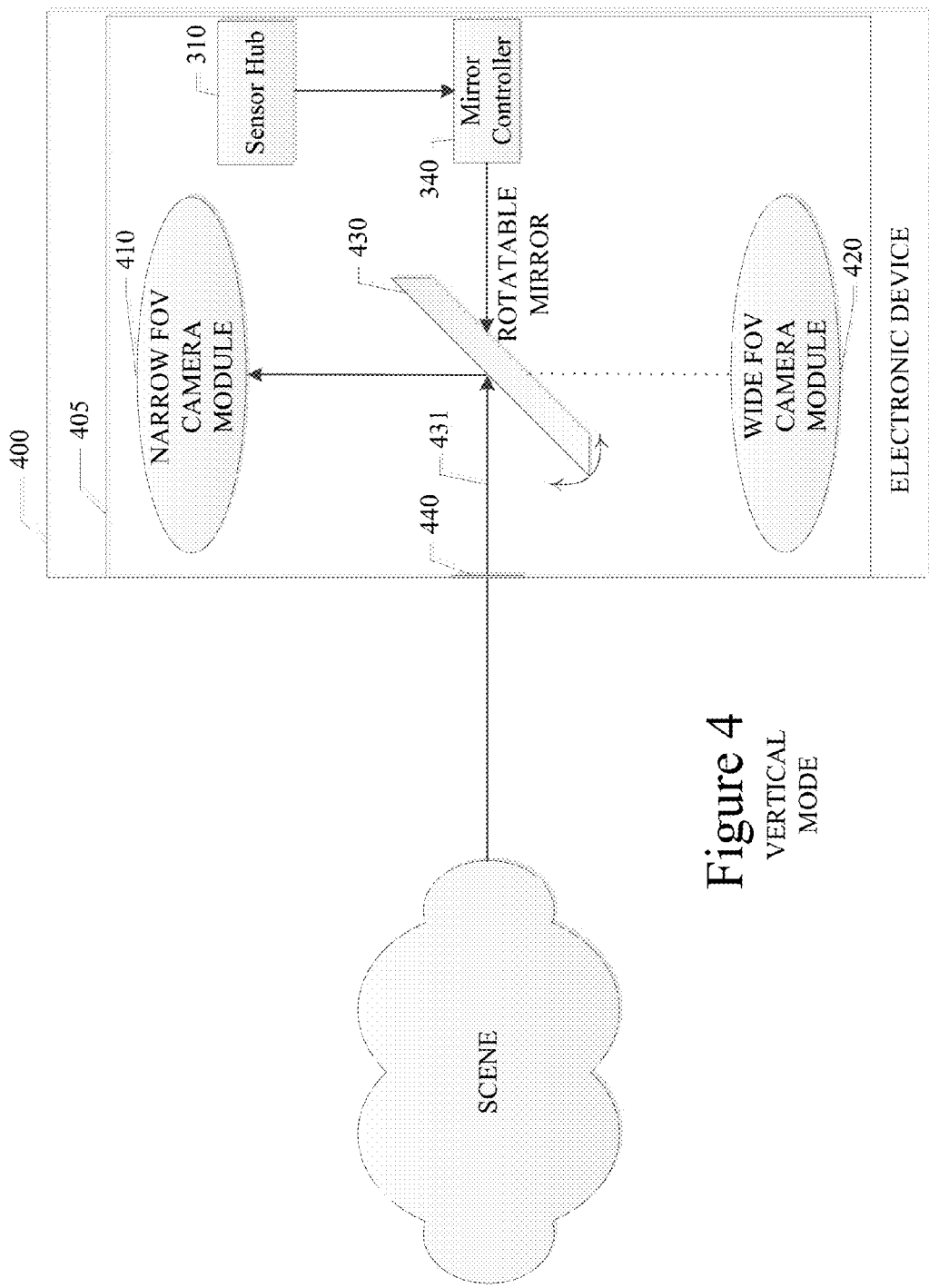
FIGS. 4 through 6 illustrate a second example embodiment in which the adaptable field of view (FOV) subsystem is implemented by providing a mirror-based mechanism to enable dynamic adjustment of the FOV of the camera.
Figure 5:
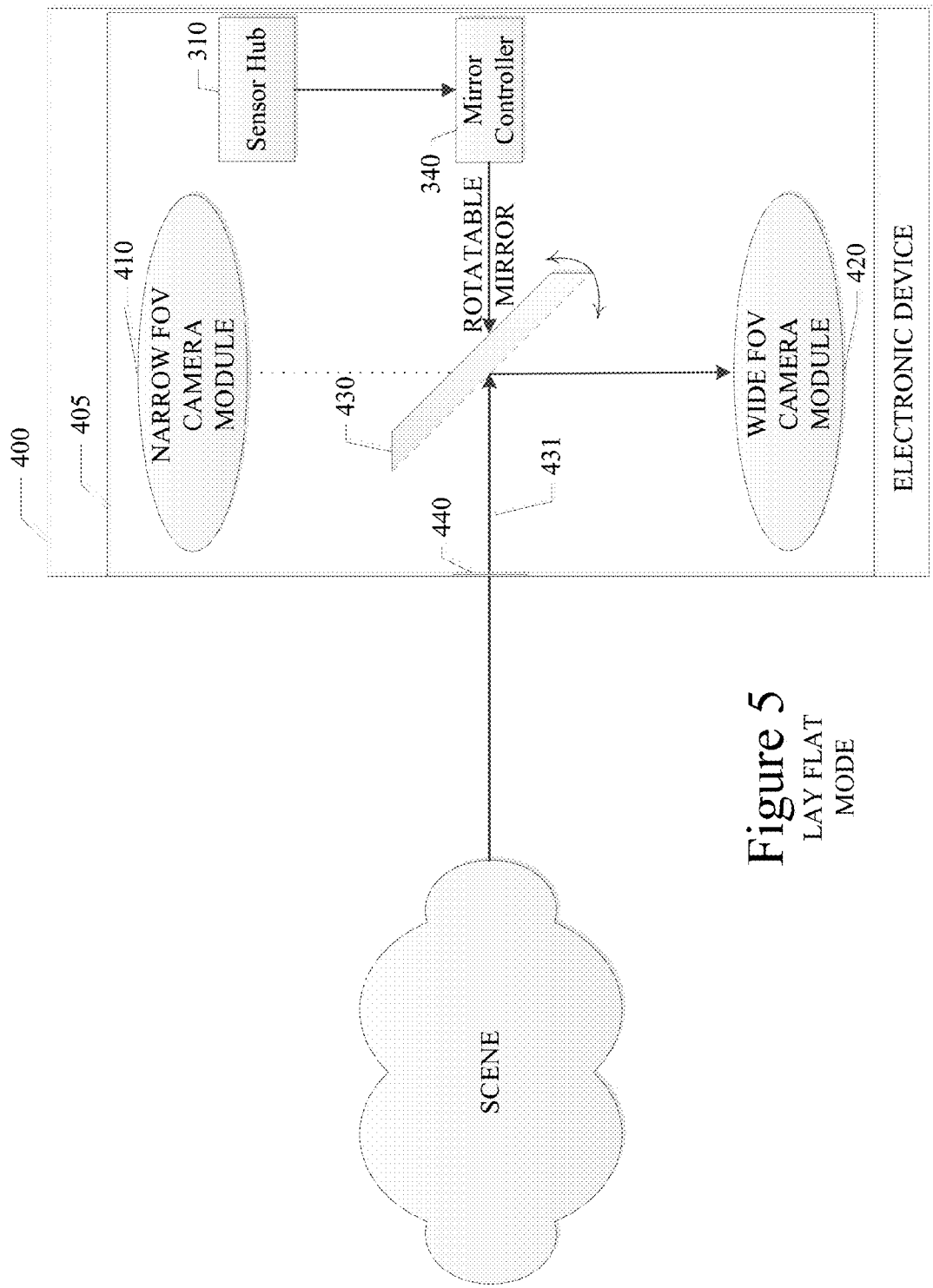
Figure 6:
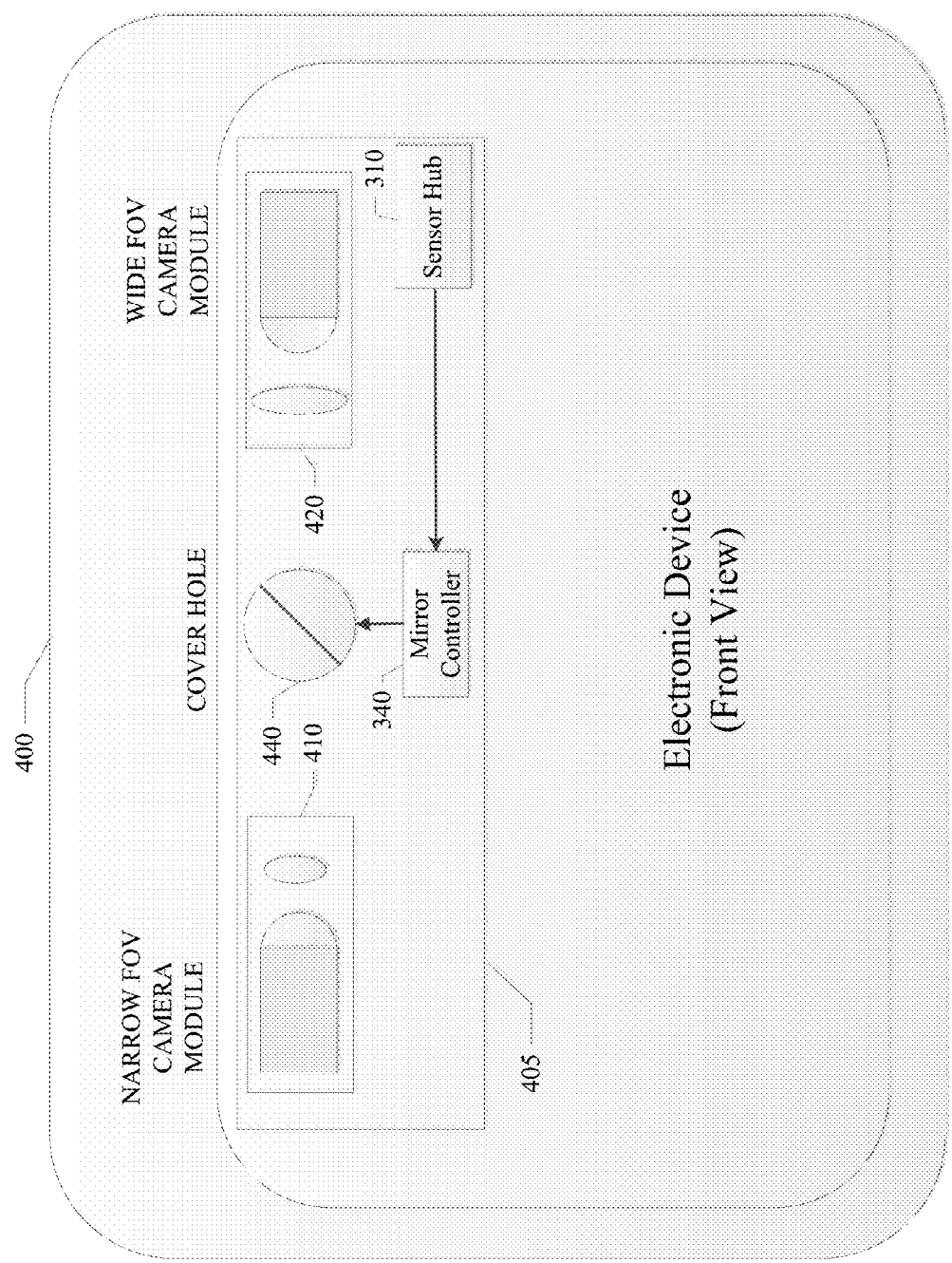
Figure 7:
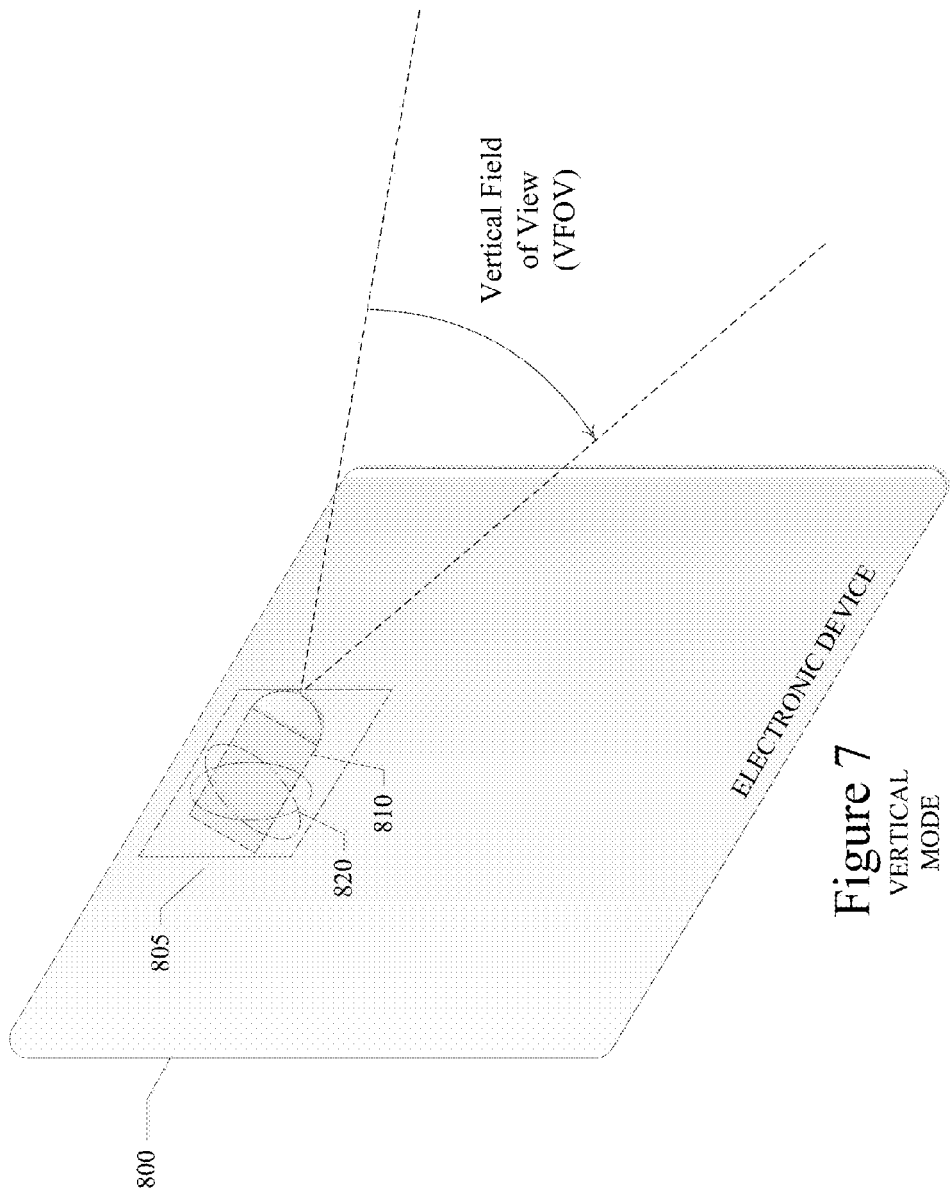
FIGS. 7 and 8 illustrate a third example embodiment in which the adaptable field of view (FOV) subsystem is implemented by providing a gimbal-based mechanism for camera module adjustment.
Figure 8:
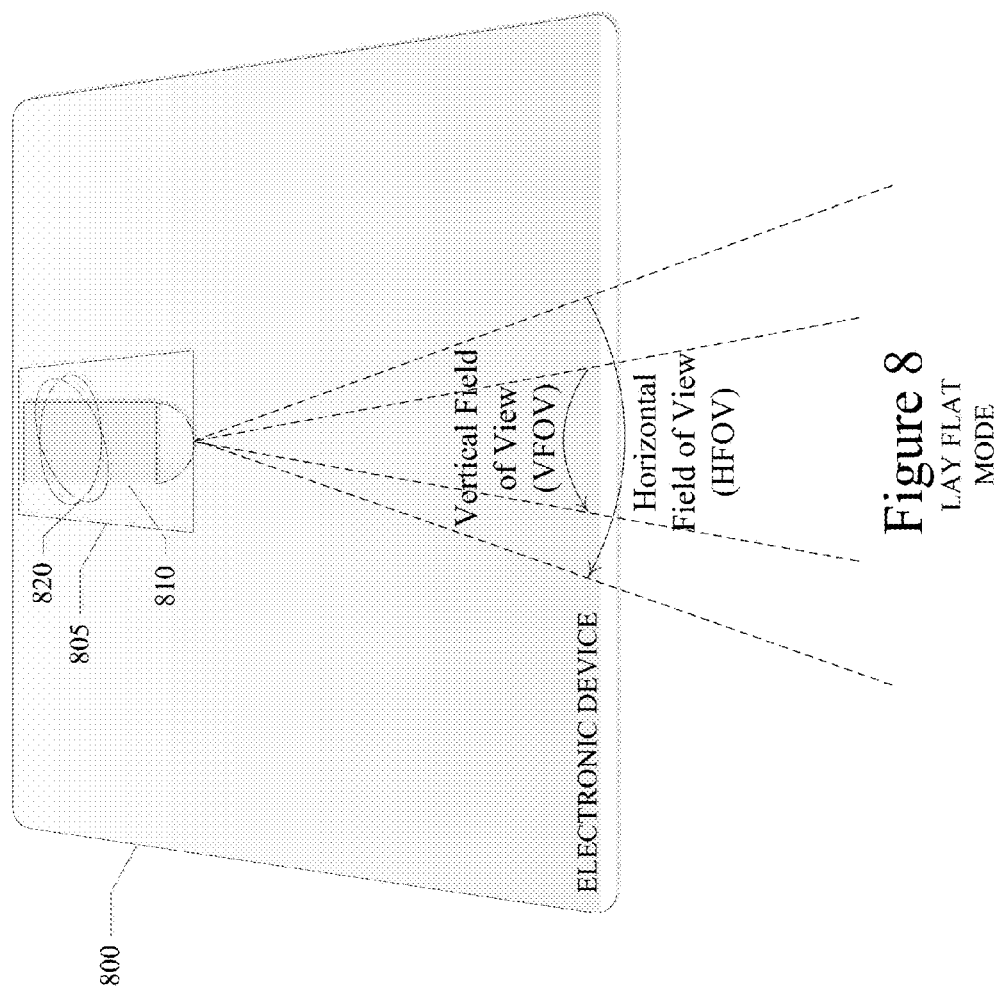

Camera modules in many conventional electronic devices, such as pAIOs, typically come with lens systems that are of fixed focal length and FOV. The various embodiments described herein provide a capability to automatically and adaptably change the FOV of the lens system of the camera in any of several different ways. In various embodiments described herein, three different systems and methods are disclosed for providing an adjustable FOV in an electronic device. In a first embodiment, the adaptable FOV subsystem is implemented by providing a lens system with a dynamically adjustable curvature of the camera lens. FIGS. 1 through 3 illustrate the first example embodiment of a system for adjusting a field of view in a camera of an electronic device. In a second embodiment, the adaptable FOV subsystem is implemented by providing a mirror-based mechanism to enable dynamic adjustment of the FOV. FIGS. 4 through 6 illustrate the second example embodiment of a system for adjusting a field of view in a camera of an electronic device. In a third embodiment, the adaptable FOV subsystem is implemented by providing a gimbal-based mechanism for camera module adjustment. FIGS. 7 and 8 illustrate the third example embodiment of a system for adjusting a field of view in a camera of an electronic device. In many of these example embodiments, a sensor hub in the electronic device includes electronic device orientation sensors (e.g., accelerometers, gyros, etc.) to detect the orientation of the electronic device. In alternative embodiments, an electronic device orientation sensor (denoted herein as a sensor) can be provided as a separate component not included in a hub or other combined functional unit. Once the orientation of the electronic device is determined by the sensor, the adaptable FOV subsystem can automatically adjust the FOV of the camera or other imaging system of the electronic device in a manner consistent with the electronic device orientation. Each of these example embodiments are described in more detail below.

Liquid Lens Based FOV Adjustment for Camera Subsystems of an Electronic Device—

Referring now to FIGS. 1 through 3 in a first example embodiment, the adaptable FOV subsystem is implemented by providing a lens system with a camera lens having a dynamically adjustable curvature. In a particular embodiment, the dynamically adjustable lens is implemented using a conventional variable focus liquid lens module 100. It will be apparent to those of ordinary skill in the art in view of the disclosure herein that alternative adjustable lens systems can be employed.

FIG. 1 shows a simplified cross-section view of a conventional variable focus lens module 100 used in a first example embodiment. Such a conventional variable focus liquid lens is described, for example, in U.S. Pat. No. 6,369,954. As shown in FIG. 1, a chamber 102 can contain at least two types of liquids, L1 and L2, between which a liquid membrane 104 is formed. The liquids L1 and L2 are both transparent, not miscible, liquids having different optical indexes and having substantially the same density. As well known, one of the liquids can be an insulating liquid and the other liquid can be a conductor liquid. At rest, the liquid membrane is centered about the optical axis, which constitutes the optical axis of the device. An electrode allows light to pass through in the vicinity of the optical axis. Electrodes can be immersed in liquids L1 and L2, as shown in FIG. 1, or attached to an internal wall of chamber 102.

When a voltage V1 is established between electrodes in contact with liquids L1 and L2, an electrical field is created which, according to the well-known electro-wetting principle, will increase the wetting region with respect to the conductor liquid. As a consequence, the conductor liquid moves and deforms the insulating liquid and the related liquid membrane 104. A deformation of the liquid membrane 104 occurs and thus a variation of the focus of the lens is thereby obtained based on the voltage level V.

As shown in FIGS. 1 and 2, the variation of the voltage V can be used to selectively vary the deformation of the liquid membrane 104 and achieve a variable focus lens. As shown in FIG. 1, a first voltage level, V1, can be applied to cause a greater degree of curvature in the liquid membrane 104, thereby achieving a narrow field of view. As shown in FIG. 2, a second voltage level, V2, can be applied to cause a lesser degree of curvature in the liquid membrane 104, thereby achieving a wide field of view. It will be apparent to those of ordinary skill in the art in view of the disclosure herein that a variety of voltage levels V can be employed to achieve a desired corresponding field of view.

Referring now to FIG. 3, in the first example embodiment described herein, the variable focus liquid lens module 100 is used in combination with other components of an adaptable field of view (FOV) subsystem 300 to provide an adaptable FOV solution for electronic devices 200 that include a camera or other image capture subsystem 202. In the example embodiment shown in FIG. 3, adaptable FOV subsystem 300 includes a sensor hub 310. Sensor hub 310 provides one or more devices to determine an orientation of the electronic device 200 in which the adaptable FOV subsystem 300 is installed. Such orientation-determining devices 312 can include conventional accelerometers, gyroscopes, and/or the like. As described above, orientation-determining devices 312 or other electronic device orientation sensors (denoted herein as a sensor) can be provided as a separate component not included in a hub or other combined functional unit. The orientation-determining devices 312 or other electronic device orientation sensor can also be provided as a separate component not included in the adaptable FOV subsystem 300. In the various sensor component configurations, the sensor can provide electronic device orientation sensor data to the adaptable FOV subsystem 300 via a sensor data interface. The orientation-determining devices 312 can provide sensor data to the adaptable FOV subsystem 300 via the sensor data interface to enable the adaptable FOV subsystem 300 to determine how the electronic device 200 is currently oriented. Specifically, the orientation-determining devices 312 can enable the adaptable FOV subsystem 300 to determine an operational mode in which the electronic device 200 is currently operating. Such electronic device 200 modes of operation can include, for example, vertical, angular, and lay flat operational modes. Information indicative of the electronic device 200 orientation and/or mode of operation generated by the sensor hub 310 can be provided as an input to a microcontroller 320 as shown in FIG. 3. The microcontroller 320 can be a specialized processing module of adaptable FOV subsystem 300. Alternatively, the microcontroller 320 can be a general data processor of the electronic device 200. The microcontroller 320 can receive the information indicative of the electronic device 200 orientation and/or mode of operation. This information input can be used to look up or otherwise obtain a corresponding voltage potential value from a pre-configured set of calibration data 322. Calibration data 322 can be stored as data in a data storage device of electronic device 200. The calibration data 322 can form an association between particular electronic device 200 orientations or operational modes and a voltage value needed to achieve a particular field of view associated with the particular orientations or operational modes. The particular voltage value corresponding to a current electronic device 200 orientation or operational mode is retrieved by microcontroller 320 and passed through a digital to analog (D/A) converter 330 to produce an analog voltage level. The analog voltage level is used to drive the liquid lens module 100, as described above, to produce a desired curvature of the liquid lens therein. As a result, the adaptable FOV subsystem 300 of electronic device 200 can produce a dynamically variable and adaptable field of view in camera 202 that corresponds to a current orientation or operational mode of the electronic device 200.

The various embodiments described herein are unique in a variety of ways. In particular, an example embodiment can use a liquid lens in a camera module 201 of an electronic device 200 to adjust the curvature of the lens to adaptably vary between a narrow FOV lens configuration in a vertical operational mode, for example, to wide FOV lens configuration in a horizontal operational mode based on the orientation or operational mode of the electronic device 200 as determined by the sensor hub 310. The liquid lens based camera module 201 as described herein can be used with an electronic device having an imaging subsystem with a focal length and camera FOV that can be adaptably adjusted based on the voltage potential applied to the lens, which modifies the spherical curvature of the liquid membrane 104. Information from the sensor hub 310 is used to detect the orientation or operational mode of the electronic device 200. This information can be sent to a microcontroller 320 on board the camera module 201. Calibration data 322 provides information about the voltage potential value that needs to be applied to the D/A converter 330 for a particular orientation or operational mode. An appropriate voltage is thus applied to the liquid lens module 100, which adjusts the FOV of the camera 202. It has been observed that to identify users positioned around the electronic device 200, the horizontal field of view (HFOV) and the vertical field of view (VFOV) should be in the range of 120 to 140 degrees. Large FOV lenses can suffer from issues of warping and distortion. In an example embodiment, additional data processing can be incorporated into the microcontroller 320 to compensate for the distortion issues by applying well-known de-warping techniques. Lens distortion can also be corrected using lens calibration. Moreover, additional data processing can be incorporated into the microcontroller 320 to perform face detection/recognition techniques to identify users situated around the electronic device. Thus, in a first embodiment as described above, the adaptable FOV subsystem is implemented by providing a lens system with a dynamically adjustable curvature of the camera lens.

Adjustable Mirror Based FOV Adjustment for Camera Subsystems of an Electronic Device—

Referring now to FIGS. 4 through 6 in a second example embodiment, the adaptable FOV subsystem is implemented by providing a mirror-based mechanism to enable dynamic adjustment of the camera FOV. In the example embodiment shown in FIG. 4, adaptable FOV subsystem 405 includes a narrow field of view (FOV) camera 410 and a wide field of view (FOV) camera 420. In a particular embodiment, the cameras 410 and 420 can each have a fixed FOV lens system. In an alternative embodiment, the cameras 410 and 420 can have a variable FOV lens system. Adaptable FOV subsystem 405 also includes a rotatable mirror 430, which can be rotated about an axis perpendicular to an optical axis 431 along which imagery is received from a scene through an opening or cover hole 440 in the electronic device 400 in which the adaptable FOV subsystem 405 is installed. As shown in FIGS. 4 and 5, mirror 430 can be rotated to reflect incoming light and scene imagery received on optical axis 431 to either narrow field of view (FOV) camera 410 (see FIG. 4) or to the wide field of view (FOV) camera 420 (see FIG. 5). The position of the mirror 430 can be controlled by a mirror control mechanism or mirror controller 340.

In the example embodiment shown in FIGS. 4 through 6, adaptable FOV subsystem 405 also includes a sensor hub 310. As described above, sensor hub 310 provides one or more devices to determine an orientation of the electronic device 400 in which the adaptable FOV subsystem 405 is installed. As described above, such orientation-determining devices can include conventional accelerometers, gyroscopes, and/or the like. The orientation-determining devices can enable the adaptable FOV subsystem 405 to determine how the electronic device 400 is currently oriented. Specifically, the orientation-determining devices of sensor hub 310 can enable the adaptable FOV subsystem 405 to determine or detect an operational mode in which the electronic device 400 is currently operating. Such electronic device 400 modes of operation can include, for example, vertical, angular, and lay flat operational modes. Information indicative of the electronic device 400 orientation and/or mode of operation generated by the sensor hub 310 can be provided as an input to the mirror control mechanism or mirror controller 340. The mirror controller 340 can drive the mirror 430 to a position enabling either the narrow FOV camera 410 or the wide FOV camera 410 to receive the scene imagery on optical axis 431. Thus, based on the orientation or operational mode of the electronic device 400 as determined by the sensor hub 310, the adaptable FOV subsystem 405 can be configured to automatically use the narrow FOV camera 410 in device orientations or operational modes consistent with a narrow FOV. Alternatively, the adaptable FOV subsystem 405 can be configured to automatically use the wide FOV camera 420 in device orientations or operational modes consistent with a wide FOV. As a result, the adaptable FOV subsystem 405 of electronic device 400 can produce a dynamically variable and adaptable field of view that corresponds to a current orientation or operational mode of the electronic device 400.

Referring now to FIG. 6, a front view of the electronic device 400 in which the adaptable FOV subsystem 405 is installed is shown. In the example embodiment shown in FIG. 6, the arrangement of the components of the adaptable FOV subsystem 405 enables the camera modules 410 and 420 to be placed at right angles in the bezel of the electronic device 400 relative to the front surface. This arrangement enables an opportunity to develop a camera module with a large aperture and large focal length in a low profile form factor. This advantage can be important as many electronic devices impose restrictions on the maximum thickness of the housing of the electronic device.

The various embodiments described herein are unique in a variety of ways. In particular, an example embodiment can use a movable mirror to adaptably and automatically redirect the light and scene imagery to a narrow FOV camera for creating a narrow FOV for viewing a user positioned in front of the camera of an electronic device configured in a vertical operational mode. Alternatively, the example embodiment can use the movable mirror to adaptably and automatically redirect the light and scene imagery to a wide FOV camera for creating a wide FOV for viewing a group of people situated around the camera of the electronic device configured in a lay flat operational mode. In each case, the field of view of the image capture device of the adaptable FOV subsystem 405 is dynamically and adaptably configured to correspond to an orientation or operational mode of the electronic device 400.

Gimbal Based Camera Orientation Adjustment—

Referring now to FIGS. 7 and 8 in a third example embodiment, the adaptable FOV subsystem 805 is implemented by providing a gimbal-based mechanism for camera module adjustment. In the example embodiment shown in FIGS. 7 and 8, adaptable FOV subsystem 805 includes a camera 810. In a particular embodiment, the camera 810 can have a fixed or a variable FOV lens system. The camera 810 can be mounted in a conventional gimbal assembly 820 that holds the camera 810 within two concentric rings that are attached to each other via a mount and placed axially at 90 degrees. As a result, the camera 810 is mounted to enable free movement of the camera 810 in at least two dimensions. The movement of the camera 810 corresponds to the movement of the electronic device 800 in which the adaptable FOV subsystem 805 is installed. The camera 810 and/or the gimbal assembly 820 can be weighted or slaved to establish a configurable orientation of the FOV of the camera 810 relative to an orientation of the electronic device 800. The camera 810 is mounted to ensure that the camera 810 FOV is not obstructed by portions of the structure of the electronic device 800. The gimbal assembly 820 can keep the camera 810 at a fixed position irrespective of the orientation of the electronic device 800.

Given the gimbal-based mechanism of adaptable FOV subsystem 805 as described above, the camera 810 can be configured to automatically move to a new FOV orientation as the electronic device 800 is moved into a new operational mode orientation. Thus, as shown in FIG. 7, the camera 810 and the gimbal assembly 820 on which the camera 810 is mounted can establish a side-facing orientation when the electronic device 800 is used in a vertical operational mode configuration. As a result, the camera 810 acts as a side facing camera in a vertical operational mode of the electronic device 800. In a vertical operational mode of the electronic device 800, the automatic positioning of the camera 810 can be used to identify a user and establish a FOV at a side of the electronic device 800 between 15 to 30 degrees down from the vertical. As shown in FIG. 8, the camera 810 and the gimbal assembly 820 on which the camera 810 is mounted can establish a front-facing orientation when the electronic device 800 is used in a lay flat operational mode configuration. As a result, the camera 810 acts as a front facing camera in a lay flat operational mode of the electronic device 800. In a lay flat operational mode, the automatic positioning of the camera 810 can be used to identify a user and establish a FOV in front of one of the longer sides of the electronic device 800.

The various embodiments described herein are unique in a variety of ways. In particular, an example embodiment can use a gimbal assembly to achieve an automatic positioning of a camera in an electronic device operating in various operational modes. For example, the electronic device can be used in a lay flat operational mode using the techniques described above to realize at least the following usage scenarios: 1) video conferencing in a lay flat operational mode; 2) face detection/recognition in a lay flat operational mode that can be used in gaming scenarios to identify players and replace game players with corresponding avatars; 3) gesture recognition in a lay flat operational mode where users can manipulate a user interface (UI) of an operating system (OS) or an application while the user is positioned in front of the electronic device; and 4) multi-modal usages like touch with gestures in a lay flat operational mode for creative editing-based applications. It will be apparent to those of ordinary skill in the art in view of the disclosure herein that a variety of alternative usage models can also be employed.

The various embodiments described herein provide systems and methods for adjusting a field of view in a camera of an electronic device. In the various embodiments described herein, the type of electronic device can include mobile computing or communication devices, two-in-one or all-in-one desktop devices, laptop computers, ultrabook computers, detachables, handheld computers, touch screen systems, tablet computing systems, Personal Digital Assistants (PDAs), cellular telephones, smartphones, web appliances, and other electronic devices typically including an embedded camera or other image-capturing subsystem. Particular embodiments can also be used with wearable electronic devices, wearable computers, wearable computing platforms, or other wearables, such as an electronic watch or Google® Glass, for example. A separate optic element connected via fiber can be used for the image capture.

The various embodiments described herein can also include a feature for manually changing or configuring the FOV in any mode of the system based on a variety of variables or user inputs including, for example, a user preference, a user setting, a user interface control mechanism, or other input control means. Such a manual FOV configuration feature can be enabled for both the liquid lens embodiments and the mirror embodiments described above.

Thus, the example embodiments described herein provide a technical solution to a technical problem. The various embodiments improve the functioning of the electronic device by providing integrated and adjustable image capture with adaptable field of view configuration in the electronic device. The various embodiments also serve to transform the captured images to a different and improved state by virtue of the variety of manipulations, modifications, and/or corrections applied to the images captured by the adaptable FOV subsystem. Additionally, the various embodiments effect an improvement in a variety of technical fields including the fields of image capture, mobile computing, information sharing, and mobile communications.

Figure 9:
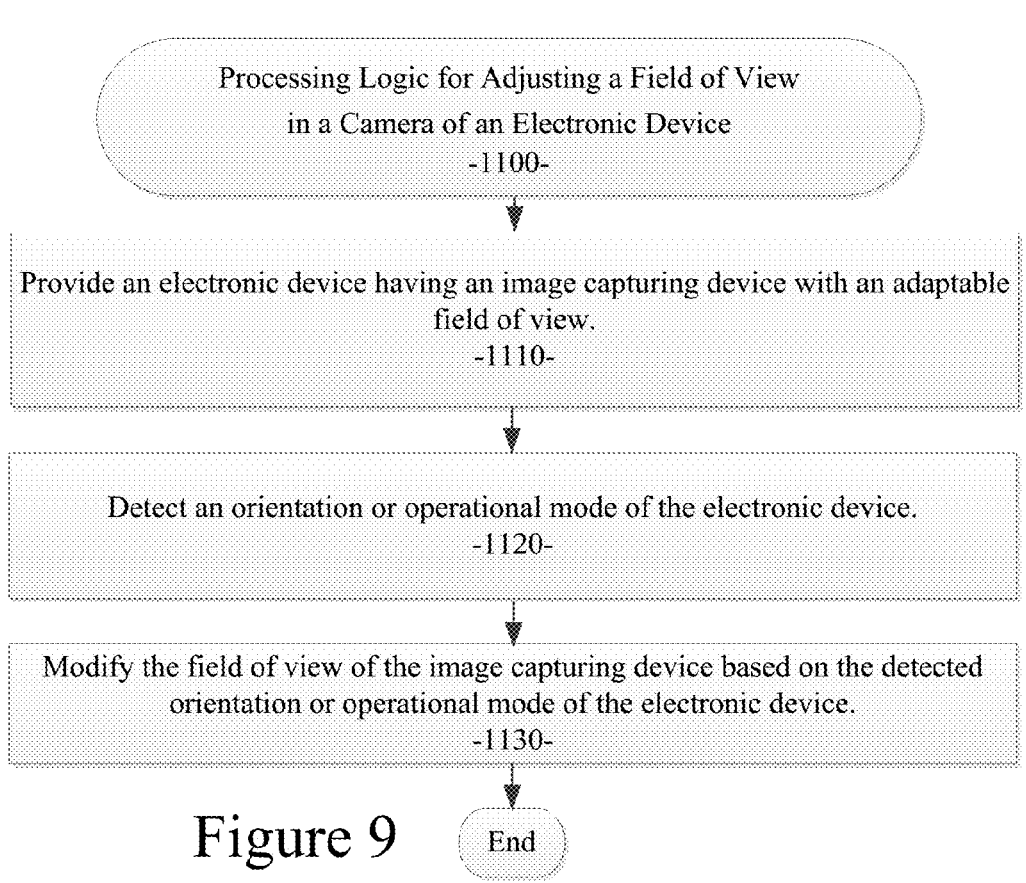
FIG. 9 is a processing flow chart illustrating an example embodiment of a method as described herein.

Referring now to FIG. 9, a processing flow diagram illustrates an example embodiment of a method 1100 for a method as described herein. The method 1100 of an example embodiment includes: providing an electronic device having an image capturing device with an adaptable field of view (processing block 1110); detecting an orientation or operational mode of the electronic device (processing block 1120); and modifying the field of view of the image capturing device based on the detected orientation or operational mode of the electronic device (processing block 1130).

Figure 10:
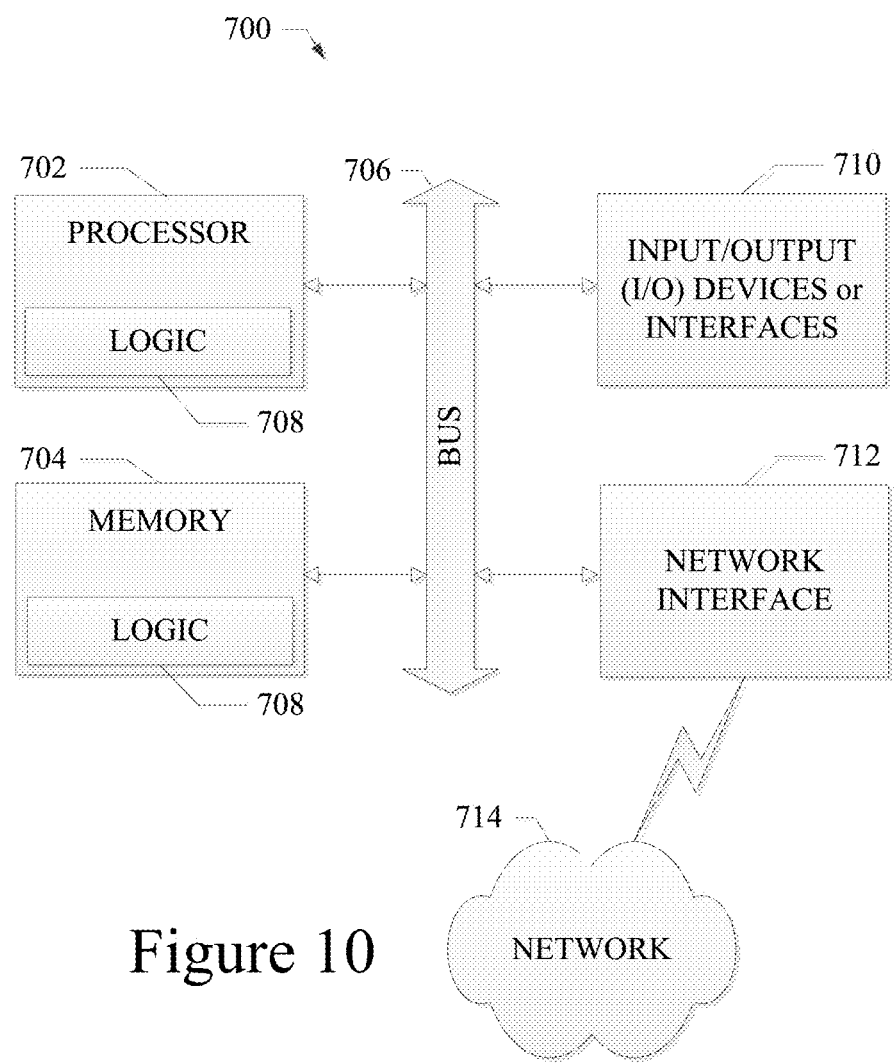
FIG. 10 shows a diagrammatic representation of a machine in the example form of a mobile computing and/or communication system within which a set of instructions when executed and/or processing logic when activated may cause the machine to perform any one or more of the methodologies described and/or claimed herein.

FIG. 10 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2 G), 2.5, 3rd (3 G), 4th (4 G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

An apparatus comprising: a sensor data interface to receive sensor data from at least one orientation-determining device; and an adaptable field of view (FOV) subsystem in data communication with the sensor data interface, the adaptable FOV subsystem being configured to modify the field of view of an image capturing device based on an orientation or operational mode of an electronic device associated with the sensor data.

The apparatus as claimed above wherein the adaptable FOV subsystem further includes a variable focus lens module configured to automatically vary the focus of a lens of the image capturing device as driven by a voltage level based on the orientation or operational mode of the electronic device.

The apparatus as claimed above wherein the adaptable FOV subsystem further includes a plurality of image capturing devices and a moveable mirror to selectively reflect light or scene imagery to one of the plurality of image capturing devices based on the orientation or operational mode of the electronic device.

The apparatus as claimed above wherein the adaptable FOV subsystem further includes a gimbal assembly to enable automatic movement of the image capturing device based on the orientation or operational mode of the electronic device.

The apparatus as claimed above wherein the at least one orientation-determining device includes a device from the group consisting of: an accelerometer and a gyro.

The apparatus as claimed above wherein the image capturing device is a camera.

The apparatus as claimed above wherein the operational mode of the electronic device is one of the operational modes from the group consisting of: vertical operational mode and lay flat operational mode.

An electronic device comprising: an image capturing device; a sensor including at least one orientation-determining device; and an adaptable field of view (FOV) subsystem in data communication with the sensor, the adaptable FOV subsystem being configured to modify the field of view of the image capturing device based on an orientation or operational mode of the electronic device detected by the sensor.

The electronic device as claimed above wherein the adaptable FOV subsystem further includes a variable focus lens module configured to automatically vary the focus of a lens of the image capturing device as driven by a voltage level based on the orientation or operational mode of the electronic device.

The electronic device as claimed above wherein the adaptable FOV subsystem further includes a plurality of image capturing devices and a moveable mirror to selectively reflect light or scene imagery to one of the plurality of image capturing devices based on the orientation or operational mode of the electronic device.

The electronic device as claimed above wherein the adaptable FOV subsystem further includes a gimbal assembly to enable automatic movement of the image capturing device based on the orientation or operational mode of the electronic device.

The electronic device as claimed above wherein the at least one orientation-determining device includes a device from the group consisting of: an accelerometer and a gyro.

The electronic device as claimed above wherein the image capturing device is a camera.

The electronic device as claimed above wherein the operational mode of the electronic device is one of the operational modes from the group consisting of: vertical operational mode and lay flat operational mode.

A method comprising: providing an electronic device having an image capturing device with an adaptable field of view; detecting an orientation or operational mode of the electronic device; and modifying the field of view of the image capturing device based on the detected orientation or operational mode of the electronic device.

The method as claimed above including automatically varying the focus of a lens of the image capturing device by driving a voltage level based on the orientation or operational mode of the electronic device.

The method as claimed above including providing a plurality of image capturing devices and selectively moving a mirror to reflect light or scene imagery to one of the plurality of image capturing devices based on the orientation or operational mode of the electronic device.

The method as claimed above including providing a gimbal assembly to enable automatic movement of the image capturing device based on the orientation or operational mode of the electronic device.

The method as claimed above wherein detecting an orientation includes using a device from the group consisting of: an accelerometer and a gyro.

The method as claimed above wherein the image capturing device is a camera.

The method as claimed above wherein the operational mode of the electronic device is one of the operational modes from the group consisting of: vertical operational mode and lay flat operational mode.

An apparatus comprising: an orientation determining means; and a field of view (FOV) adaptation means in data communication with the orientation determining means, the FOV adaptation means being configured to modify the field of view of an image capturing device based on an orientation or operational mode of an electronic device detected by the orientation determining means.

The apparatus as claimed above wherein the FOV adaptation means further includes a variable focus lens means configured to automatically vary the focus of a lens of the image capturing device as driven by a voltage level based on the orientation or operational mode of the electronic device.

The apparatus as claimed above wherein the FOV adaptation means further includes a plurality of image capturing devices and a moveable reflecting means to selectively reflect light or scene imagery to one of the plurality of image capturing devices based on the orientation or operational mode of the electronic device.

The apparatus as claimed above wherein the FOV adaptation means further includes a gimbal assembly means to enable automatic movement of the image capturing device based on the orientation or operational mode of the electronic device.

The apparatus as claimed above wherein the orientation determining means includes a device from the group consisting of: an accelerometer and a gyro.

The apparatus as claimed above wherein the image capturing device is a camera.

The apparatus as claimed above wherein the operational mode of the electronic device is one of the operational modes from the group consisting of: vertical operational mode and lay flat operational mode.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
    a mobile computing platform with a display and an image capturing device integrated into a housing with a low profile form factor;
    a sensor data interface, integrated into the housing of the mobile computing platform, to receive sensor data from at least one orientation-determining device integrated into the housing of the mobile computing platform; and
    an adaptable field of view (FOV) subsystem, integrated into the housing of the mobile computing platform, in data communication with the sensor data interface, the adaptable FOV subsystem being configured to modify the field of view of the image capturing device based on an orientation or operational mode of the mobile computing platform.

2. The apparatus as claimed in claim 1 wherein the adaptable FOV subsystem further includes a variable focus lens module configured to automatically vary the focus of a lens of the image capturing device as driven by a voltage level based on the orientation or operational mode of the mobile computing platform.

3. The apparatus as claimed in claim 1 wherein the adaptable FOV subsystem further includes a plurality of image capturing devices and a moveable mirror, integrated into the housing of the mobile computing platform, to selectively reflect light or scene imagery to one of the plurality of image capturing devices based on the orientation or operational mode of the mobile computing platform.

4. The apparatus as claimed in claim 1 wherein the adaptable FOV subsystem further includes a gimbal assembly, integrated into the housing of the mobile computing platform, to enable automatic movement of the image capturing device based on the orientation or operational mode of the mobile computing platform.

5. The apparatus as claimed in claim 1 wherein the at least one orientation-determining device includes a device from the group consisting of: an accelerometer and a gyro.

6. The apparatus as claimed in claim 1 wherein the image capturing device is a camera.

7. The apparatus as claimed in claim 1 wherein the operational mode of the mobile computing platform is one of the operational modes from the group consisting of: vertical operational mode and lay flat operational mode.

8. The apparatus as claimed in claim 1 wherein the mobile computing platform is of a type from the group consisting of: portable electronic devices, all-in-one desktop devices, portable-all-in-one devices (pAIO), laptop computers, handheld computers, and touch screen systems.

9. A mobile computing platform comprising:
    a display;
    an image capturing device;
    a sensor including at least one orientation-determining device; and
    an adaptable field of view (FOV) subsystem, integrated with the display, the image capturing device, and the sensor into a housing of the mobile computing platform with a low profile form factor, the FOV subsystem being in data communication with the sensor, the adaptable FOV subsystem being configured to modify the field of view of the image capturing device based on an orientation or operational mode of the mobile computing platform.

10. The mobile computing platform as claimed in claim 9 wherein the adaptable FOV subsystem further includes a variable focus lens module configured to automatically vary the focus of a lens of the image capturing device as driven by a voltage level based on the orientation or operational mode of the mobile computing platform.

11. The mobile computing platform as claimed in claim 9 wherein the adaptable FOV subsystem further includes a plurality of image capturing devices and a moveable mirror, integrated into the housing of the mobile computing platform, to selectively reflect light or scene imagery to one of the plurality of image capturing devices based on the orientation or operational mode of the mobile computing platform.

12. The mobile computing platform as claimed in claim 9 wherein the adaptable FOV subsystem further includes a gimbal assembly, integrated into the housing of the mobile computing platform, to enable automatic movement of the image capturing device based on the orientation or operational mode of the mobile computing platform.

13. The mobile computing platform as claimed in claim 9 wherein the at least one orientation-determining device includes a device from the group consisting of: an accelerometer and a gyro.

14. The mobile computing platform as claimed in claim 9 wherein the image capturing device is a camera.

15. The mobile computing platform as claimed in claim 9 wherein the operational mode of the mobile computing platform is one of the operational modes from the group consisting of: vertical operational mode and lay flat operational mode.

16. The mobile computing platform as claimed in claim 9 wherein the mobile computing platform is of a type from the group consisting of: portable electronic devices, all-in-one desktop devices, portable-all-in-one devices (pAIO), laptop computers, handheld computers, and touch screen systems.

17. An apparatus comprising:
- a mobile computing platform means with a display means and an image capturing means integrated into a housing with a low profile form factor;
- an orientation determining means integrated into the housing of the mobile computing platform means; and
- a field of view (FOV) adaptation means, integrated into the housing of the mobile computing platform means, in data communication with the orientation determining means, the FOV adaptation means being configured to modify the field of view of the image capturing means based on an orientation or operational mode of the mobile computing platform means.

18. The apparatus as claimed in claim 17 wherein the FOV adaptation means further includes a variable focus lens means configured to automatically vary the focus of a lens of the image capturing device as driven by a voltage level based on the orientation or operational mode of the mobile computing platform means.

19. The apparatus as claimed in claim 17 wherein the FOV adaptation means further includes a plurality of image capturing devices and a moveable reflecting means, integrated into the housing of the mobile computing platform means, to selectively reflect light or scene imagery to one of the plurality of image capturing devices based on the orientation or operational mode of the mobile computing platform means.

20. The apparatus as claimed in claim 17 wherein the mobile computing platform means is of a type from the group consisting of: portable electronic devices, all-in-one desktop devices, portable-all-in-one devices (pAIO), laptop computers, handheld computers, and touch screen systems.

* * * * *